March 12, 1968  A. T. BESTLAND ETAL  3,372,685
EXCESSIVE CRANKCASE PRESSURE WARNING SYSTEM AND RELIEF VALVE
Filed Dec. 5, 1966
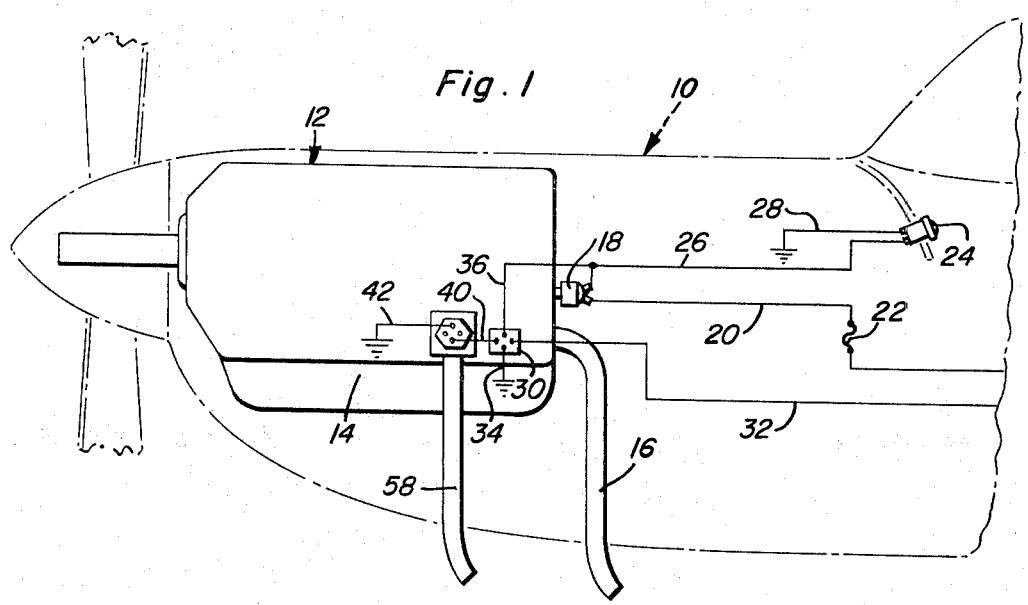
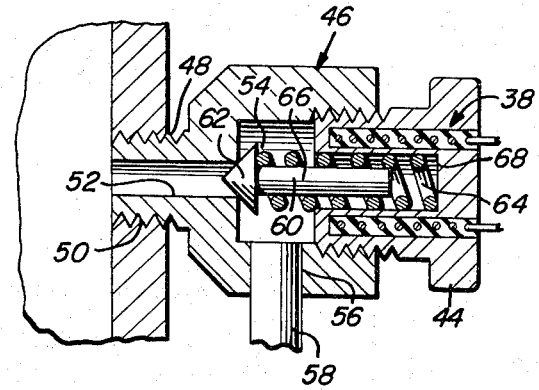
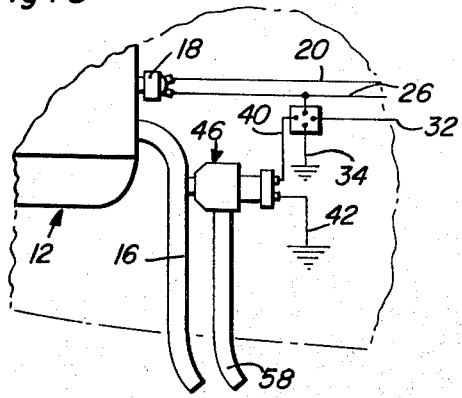
Ardell T. Bestland
Thomas M. Breton
INVENTORS
BY *Clarence A. O'Brien*
and *Harvey B. Jackson*
Attorneys

United States Patent Office 3,372,685
Patented Mar. 12, 1968

3,372,685
EXCESSIVE CRANKCASE PRESSURE WARNING
SYSTEM AND RELIEF VALVE
Ardell T. Bestland, 1230 S. 9th St., and Thomas M. Breton, 1906 S. 19th St., both of Grand Forks, N. Dak. 58201
Filed Dec. 5, 1966, Ser. No. 599,072
8 Claims. (Cl. 123—198)

This invention relates to a novel and useful pressure warning system and relief valve for the crankcase of an internal combustion engine.

Aircraft engines operating at high altitudes and provided with crankcase breather outlets sometimes experience ice clogging of these breather outlets due to the very low temperatures encountered at high altitudes. Ice clogging of the breather outlet can cause excessive crankcase pressures to form in the crankcase due to "piston blow-by" and a constant increase in crankcase pressure ultimately causes one or more engine seals to be ruptured with a resultant loss of engine lubricating oil at an excessive rate. Although aircraft engines are provided with large oil capacity lubricating systems, oil leakage past a ruptured seal by crankcase pressures even slightly higher than the pressure of the ambient atmosphere can be quite rapid with the result that even a large oil capacity lubricating system will soon have its reserve supply of oil depleted to or below a minimum reserve thus necessitating that an aircraft land almost immediately whenever a breather pipe or outlet becomes clogged and an engine seal is ruptured.

It is accordingly the main object of this invention to provide an excessive crankcase pressure warning system for an internal combustion engine such as that utilized in aircraft.

Another object of this invention is to provide the warning system with supplemental crankcase pressure relief means which is normally closed and therefore not susceptible to icing and yet which includes valve means which may be actuated to open the supplemental pressure relief means.

Another object of this invention, in accordance with the preceding object, is to provide a warning system with electrically actuatable signal means for indicating when excess crankcase pressures are present and electrically actuatable valve means for the supplemental pressure relief means electrically connected to the circuitry for the electrical signal means whereby the supplemental pressure relief means will be opened simultaneously with the rendering of the warning of excessive crankcase pressures.

A still further object of this invention is to provide the valve means for the excessive pressure relief means with a pressure responsive valve member operable, upon an increase of crankcase pressures above that pressure which is operable to actuate the electrically actuatable signal means, to open the excessive pressure relief valve means independently of the means by which the valve for the supplemental pressure relief means may be electrically actuated.

A final object of this invention to be specifically enumerated herein is to provide an excessive crankcase pressure warning system and relief valve assembly which will conform to conventional forms of manufacture, be of simple construction and substantially automatic in operation so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatical view of the forward portion of a single engine aircraft with the excessive crankcase pressure warning system and relief valve of the instant invention operatively associated with the aircraft engine;

FIGURE 2 is an enlarged fragmentary transverse vertical sectional view taken substantially upon a plane passing through the supplemental pressure relief means of the instant invention; and FIGURE 3 is a fragmentary diagrammatical view similar to that of FIGURE 1 but illustrating a modified form of supplemental pressure relief means.

Referring now more specifically to the drawings the numeral 10 generally designates an aircraft including an engine generally referred to by the reference numeral 12. The engine 12 comprises an internal combustion engine including a lower crankcase portion 14 provided with a conventional crankcase breather pipe 16.

The breather pipe 16 is provided conventionally to vent the interior of the crankcase 14 in order to prevent a buildup of pressure in the crankcase 14 due to "piston blow-by." Inasmuch as two of the by-products of internal combustion within the engine 12 are carbon monoxide and water, considerable amounts of water vapor are discharged through the breather pipe 16. If the aircraft 10 is flying at a reasonably high altitude through air whose temperature is considerably below the temperature at which water freezes, condensation of the water vapor in the gases passing outwardly of the pipe 16 begins to build up on the inside of the outlet end of the pipe 16 in the form of ice. As this buildup of ice increases the effective cross-sectional area of the pipe 16 is gradually reduced until the pipe 16 is completely blocked by ice.

After the pipe 16 has ben completely blocked by ice, "piston blow-by" within the crankcase 14 tends to rapidly build up pressure within the crankcase 14 and unless this pressure if vented to the ambient atmosphere one or more oil seals (not shown) of the engine 12 will be ruptured with a resultant rapid loss of engine lubricating oil.

The system of the instant invention includes a pressure sensitive switch 18 supported from the engine 12 in operative communication with the interior of the crankcase 14. The switch 18 is preset to close upon the buildup of pressure within the crankcase 14 to a predetermined level and the switch 18 is operatively connected to any suitable source of electrical potential (not shown) by a conductor 20 having a fuse 22 serially connected therein. The switch 18 is electrically connected to an electrically actuatable visual signal means 24 by means of a conductor 26 and the signal means 24 is grounded by means of a suitable conductor 28. In this manner, as soon as the pressure sensitive switch 18 senses a buildup of pressure within the crankcase 14 above the predetermined level, the visual signal means 24 will be electrically actuated.

In addition, a relay switch 30 is electrically connected to the source of electrical potential by means of a conductor 32 and is grounded by means of a conductor 34. Additionally, the relay 34 is connected to the conductor 26 through a conductor 36 and an electromagnet assembly generally referred to by the reference numeral 38 is connected to the relay switch 30 by means of a conductor 40 and grounded by means of a conductor 42. The relay switch 30 is normally open but is closed by being electrically actuated through the switch 18 and thus is operative to electrically connect the electromagnet 38 to the source (not shown) of electrical potential to which the conductor 32 is connected whenever the switch 18 is closed by an excess of pressure within the crankcase 14.

The electromagnet 38 is supported from a closure plug 44 of a valve assembly generally referred to by the reference numeral 46. The valve assembly 46 includes an externally threaded neck portion 48 threadedly engaged in a supplemental excess pressure outlet 50 communicated with the interior of the crankcase 14 and the neck 48 has an inlet passage 52 formed therethrough which opens into a central cavity 54 defined within the valve assembly 46. In addition, the valve assembly 46 also includes an outlet passage 56 in which the inlet end of a supplemental crankcase breather pipe 58 is secured.

The valve assembly 46 includes a valve member 60 reciprocally supported from the plug 44 for movement toward and away from the outlet end of the inlet passage 52 and including a head portion 62 which is seatingly engageable in the outlet end of the inlet passage 52 to close the latter. Further, a compression spring 64 is disposed about the shank portion 66 of the valve member 60 and has one end bearing against the head 62 while the other end is seated within the blind bore 68 formed in the plug 44 and in which the valve member 60 is reciprocal.

Of course, upon actuation of the electromagnet 38 by the relay switch 30 as a result of the switch 18 closing in response to an increase of pressure within the crankcase 14, the valve member 60, which acts as an armature, is retracted away from the outlet end of the inlet passage 52 by the magnetic attraction thereon effected by the electromagnet 38. However, if for any reason the electromagnet 38 should fail or any portion of the electrical system provided for actuation of the electromagnet fails, a buildup of pressure within the crankcase 14 to a level above the pressure level required to actuate the switch 18 will cause the head 62 of the valve member 60 to be displaced outwardly of the outlet end of the inlet passage 52 by the excess crankcase pressure acting upon that portion of the head 62 registered with the outlet end of the inlet passage 52.

With attention now invited more specifically to FIGURE 3 of the drawings there will be seen a modified assembly in which the externally threaded neck portion 48 of the valve assembly 46 is threaded into the inlet end of a conventional crankcase breather pipe 16'. Otherwise, the assemblage illustrated in FIGURE 3 is substantially identical to that illustrated in FIGURES 1 and 2 and therefore corresponding reference numerals have been utilized in FIGURE 3.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an internal combustion engine crankcase including a crankcase breather outlet pipe subject to blockage, pressure sensing means communicated with the interior of said crankcase and operative to render a signal at a remote location in response to a rise in pressure within said crankcase above a predetermined pressure.

2. The combination of claim 1 wherein said pressure sensing means includes electrically actuatable signal means adapted for disposition in said remote location, a pressure sensing switch operatively communicated with the interior of said crankcase, and electric circuit means electrically connecting said switch and said signal means and adapted for electrical connection to a suitable source of electrical potential.

3. The combination of claim 2 wherein said crankcase includes a supplemental excess pressure outlet, normally closed valve means operatively associated with said pressure outlet and including an electrically actuatable operator operatively electrically connected in said electric circuit means to open said valve means and vent said excess pressure outlet to the ambient atmosphere in response to electrical actuation of said signal means.

4. The combination of claim 3 wherein said normally closed valve means also includes pressure actuatable means operative in response to an increase of pressure in said crankcase above a second pressure above the first mentioned pressure to open said normally closed valve means independent of actuation of said electrically actuatable operator.

5. In combination with an internal combustion engine crankcase including a crankcase breather outlet subject to blockage, supplemental excess pressure outlet means for said crankcase including normally closed valve means operatively associated with said excess pressure outlet means and including an electrically actuatable operator, a pressure sensing switch operatively communicated with the interior of said crankcase, electric circuit means adapted for electrical connection with a suitable source of electrical potential and in which said pressure sensitive switch and said electrically actuatable operator are electrically connected, said pressure sensing switch being operative, in response to an increase in pressure in said crankcase above a predetermined level, to electrically connect said operator to said source whereby said valve means will be opened and vent said crankcase to the ambient atmosphere.

6. The combination of claim 5 wherein said normally closed valve means also includes pressure actuatable means operative in response to an increase of pressure in said crankcase above a second pressure above the first mentioned pressure to open said normally closed valve means independent of actuation of said electrically actuatable operator.

7. The combination of claim 6 wherein said valve means includes a valve body including an inlet passage communicated at its inlet end with the interior of said crankcase, the outlet end of said inlet passage opening into a chamber within said body, said body including an outlet passage whose inlet opens into said chamber, a valve member including a valve head movably supported in said chamber for movement into and out of operative position in seated engagement with the outlet end of said inlet passage closing the latter and spring urged toward said operative position, said head representing sufficient cross-sectional area in the portion thereof registered with said inlet passage to generate sufficient force, when subjected to said second pressure, to urge said head away from its operative position closing the outlet end of said inlet passage.

8. The combination of claim 4 wherein said valve means includes a valve body including an inlet passage communicated at its inlet end with the interior of said crankcase, the outlet end of said inlet passage opening into a chamber within said body, said body including an outlet passage whose inlet opens into said chamber, a valve member including a valve head movably supported in said chamber for movement into and out of operative position in seated engagement with the outlet end of said inlet passage closing the latter and spring urged toward said operative position, said head representing sufficient cross-sectional area in the portion thereof registered with said inlet passage to generate sufficient force, when subjected to said second pressure, to urge said head away from its operative position closing the outlet end of said inlet passage.

References Cited

UNITED STATES PATENTS

| 2,056,755 | 10/1936 | Welch | 123—41.86 |
| 2,172,522 | 9/1939 | Sline | 123—41.86 |
| 3,261,336 | 7/1966 | Lucas et al. | 123—198 |

FOREIGN PATENTS

| 1,108,982 | 6/1961 | Germany. |

WENDELL E. BURNS, *Primary Examiner.*